United States Patent
Van Steenwijk et al.

(10) Patent No.: US 7,389,384 B2
(45) Date of Patent: Jun. 17, 2008

(54) APPARATUS AND METHOD FOR FETCHING DATA FROM MEMORY

(75) Inventors: Gijs Van Steenwijk, Birmensdorf (CH); Fabrizio Campanale, Birmensdorf (CH)

(73) Assignee: DSP Group Switzerland AG, Zurich (CH)

( * ) Notice: Subject to any disclaimer, the term of this patent is extended or adjusted under 35 U.S.C. 154(b) by 165 days.

(21) Appl. No.: 10/512,620

(22) PCT Filed: Apr. 22, 2003

(86) PCT No.: PCT/IB03/01613

§ 371 (c)(1),
(2), (4) Date: Jul. 25, 2005

(87) PCT Pub. No.: WO03/093980

PCT Pub. Date: Nov. 13, 2003

(65) Prior Publication Data

US 2006/0004949 A1  Jan. 5, 2006

(30) Foreign Application Priority Data

Apr. 30, 2002  (EP) .................................. 02009726

(51) Int. Cl.
*G06F 12/06* (2006.01)

(52) U.S. Cl. ........................................ 711/119; 711/137
(58) Field of Classification Search ....................... None
See application file for complete search history.

(56) References Cited

U.S. PATENT DOCUMENTS

| | | | | |
|---|---|---|---|---|
| 5,586,081 A * | 12/1996 | Mills et al. | ............. | 365/230.08 |
| 6,587,934 B2 * | 7/2003 | Miura et al. | ................. | 711/154 |
| 2002/0144059 A1* | 10/2002 | Kendall | ...................... | 711/118 |
| 2003/0204657 A1* | 10/2003 | Lehwalder et al. | .......... | 710/301 |

* cited by examiner

*Primary Examiner*—T Nguyen
(74) *Attorney, Agent, or Firm*—Ohlandt, Greeley, Ruggiero & Perle, LLC

(57) ABSTRACT

The integrated circuit according to the invention comprises a processor (603), a non-volatile memory (602) and an interface (605), where said interface (605) contains a first cache memory (601.1) and a second cache memory (601.2) and connects the processor (603) to the non-volatile memory (602). The interface (605) gets data from the non-volatile memory (602) and stores them in said first or said second cache memory (601.1, 601.2) intermediately and provides the processor (603) with data from said first cache memory (601.1) or from said second cache memory (601.2), depending on where the requested data are stored.

15 Claims, 7 Drawing Sheets

APPARATUS AND METHOD FOR FETCHING DATA FROM MEMORY

The invention relates to an integrated circuit and a method for fetching data from a non-volatile memory embedded in an integrated circuit.

Integrated circuits of this kind are extensively used in portable devices, e.g. wireless modules, Bluetooth devices, mobile phones, digital cordless devices or personal digital assistants (PDAs). In this market, size and power consumption are decisive factors, thus the small area factor becomes a primary request. Consequently, the chance to integrate a non volatile memory on the die of a memory control unit (MCU) of the baseband system seems to be the best choice in terms of reduced components count, low pin out count, rout ability and reduced system costs.

On the other hand, several other aspects contribute to improve the performance/costs ratio of a baseband system on chip (SOC).

Though depending somewhat on the architectural features, one of the most effective characteristics is an appropriately chosen memory hierarchy. Distributing the memory resources through a hierarchy with different access capabilities and different costs and sizes results in an overall improvement of the system performance.

A typical, so-called Harvard Architecture is shown in FIG. 1. A bridge 101 is connected over a 32-bit bus 104 to advanced system bus (ASB) modules 105, a memory management unit (MMU) 106, a RAM 107 and a flash memory 102. An advanced RISE machine (ARM) 103 is connected to the MMU 106. Over a 16-bit bus 108, the bridge 101 is connected to advanced peripheral bus (APB) modules 109. These can be universal serial bus (USB) modules, for example. It is evident that the main costs in terms of area are in the memory hierarchy. So a smart choice of the sizes and types of memory, strictly depending on the performance required, is the base of design success.

Applications requiring a certain layer of software for the microcontroller within a Harvard Architecture, a read only memory (ROM) is typically used for the instruction memory (IMEM), while for the data memory a volatile memory, e.g. Ea DRAM or SRAM, is the best choice. The advantage of this lies in the chance to use the boot code memory space on the die also as instruction memory, thus saving space and increasing the robustness and the security of the system. The advantage is that an embedded ROM, being integrated with the baseline process, does not require special technology options.

Unfortunately such a solution requires a stable software and is thus suitable only for final production cases. On the other hand, most applications need several software refinements, making the ROM solution for the IMEM not suitable. Thus, an embedded flash memory used as IMEM could represent the best solution in terms of size and performance.

In Cácares et al. U.S. Pat. No. 5,802,554, a method and a system for reducing memory access latency by providing fine grain direct access to flash memory concurrent with a block transfer therefrom is described. The memory management unit controls the content of the cache with data either from a first level of memory hierarchy or a second level of memory hierarchy. However, this solution cannot use the flash memory as IMEM.

A first object of the invention is to provide an integrated circuit and a method for fetching data from a non-volatile memory embedded in an integrated circuit, with which integrated circuit and method the miss rate can be reduced, especially in those cases, where the misses are predictable. This is the case, for instance, when the code is regular, which means that the code does not contain too many branches or jumps to remote addresses, but the limit is the throughput of the instruction memory.

Another object of the invention is to get a quick access time and to reduce the silicon area at the same time.

The problem is solved by an integrated circuit with the features according to claim 1 and by a method for fetching data from a non-volatile memory embedded in an integrated circuit with the features according to claim 9.

An advantage of the invention is that the non volatile memory can be used as instruction memory and is suitable for an ARM or another microprocessor based subsystem.

The integrated circuit according to the invention comprises a processor, a non-volatile memory and an interface, where said interface contains a first cache memory and a second cache memory and connects the processor to the non-volatile memory. The interface gets data corresponding to a determined address from the non-volatile memory and stores them in the first or the second cache memory intermediately. The interface also provides the processor with data from the first cache or the second cache, depending on where the requested data are stored and autonomously fetches data from the non-volatile memory corresponding to a next determined address.

The method for fetching data from a non-volatile memory embedded in an integrated circuit according to the invention comprises a number of steps:

A part of the data from said non-volatile memory is buffered in two cache memories under a first and a second tag address.

If data are requested (by a requesting means) from the non-volatile memory, the address corresponding to said data will be compared with the two tag addresses.

If the data address equals one of the two tag addresses, the data in the cache memory are delivered to the requesting means and the data in the other cache are updated.

Otherwise, both cache memories are updated at the same time and the requested data are delivered to the requesting means.

Advantageous further developments of the invention arise from the characteristics and features identified in the dependent claims.

Advantageously, because of an easy way of realization, the interface (605) contains an address predictor (610, 611) which delivers the next determined address which is the succeeding address.

In a first embodiment of the invention, the non volatile memory is a flash memory.

In a second embodiment, the interface contains an address comparator which gets an address from the processor and compares it with two addresses corresponding to the data stored in the first and the second cache memory.

Advantageously said address comparator is a permanent address comparator which delivers a first output signal when the address from the processor is equal to the address corresponding to the data stored in the first cache and which delivers a second output signal when the address from the processor is equal to the address corresponding to the data in the second cache.

If the two addresses corresponding to the data stored in the first and the second cache memories are a first and a second tag, the comparison between the addresses can be done in an easy way.

It is also possible that said interface delivers the data to the processor directly from the non-volatile memory when the data are not buffered in the cache memories. This avoids any intermediate storage in one of the cache memories.

Advantageously, the data word widths in each of the first and the second cache memories and in the non-volatile memory are the same.

A further advantage of the invention is that the non-volatile memory can also be used as instruction memory.

In an embodiment of the method according to the invention, the data updating is done by a predictive reading of the non-volatile memory.

In a further embodiment of the method according to the invention, said cache memory is updated with the data corresponding to the succeeding address.

Subsequently, the invention is further explained with the eleven following figures.

Integrating the flash memory on the same die on which the microprocessor is integrated could arise several problems, both from the point of view of the technology, for example because of power consumption, leakage or qualification and from the point of view of the architecture for example because of testability or interfacing for programming operation of the system. Moreover if the flash memory will be used as direct IMEM for the processor the difficulties to get good performance explode. In fact the absolute speed of the flash memory in reading access is slower then the speed in reading access of a ROM or RAM. This implies that using the flash memory in the critical data path of the application will represent the bottleneck of the whole system.

Figure 1:
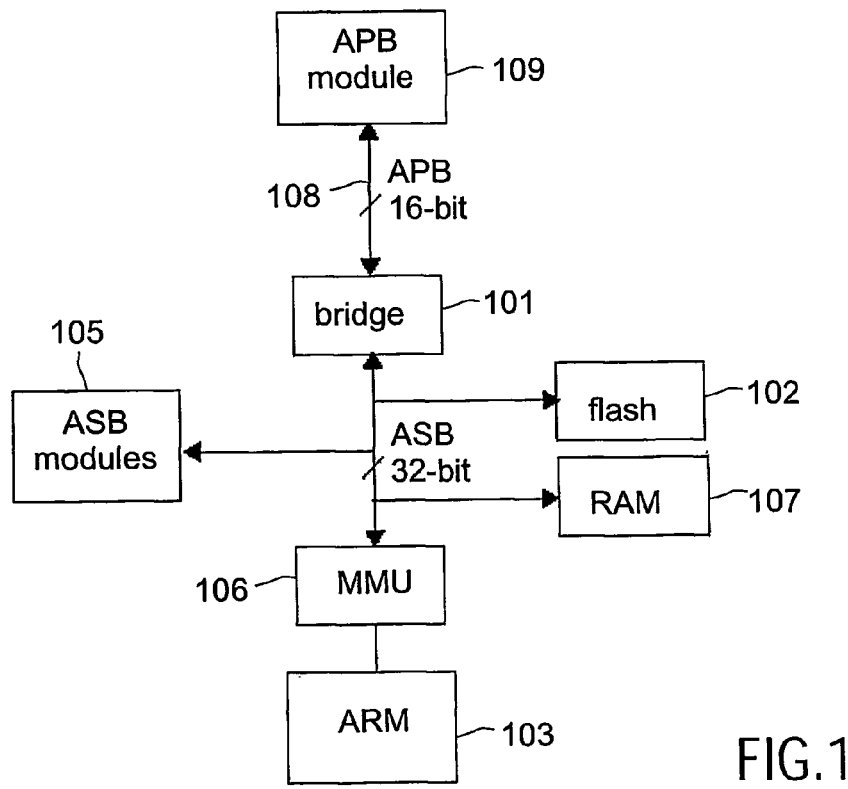
FIG. 1 shows an advanced RISE machine based subsystem with embedded flash memory according to the state of the art.
Figure 2:
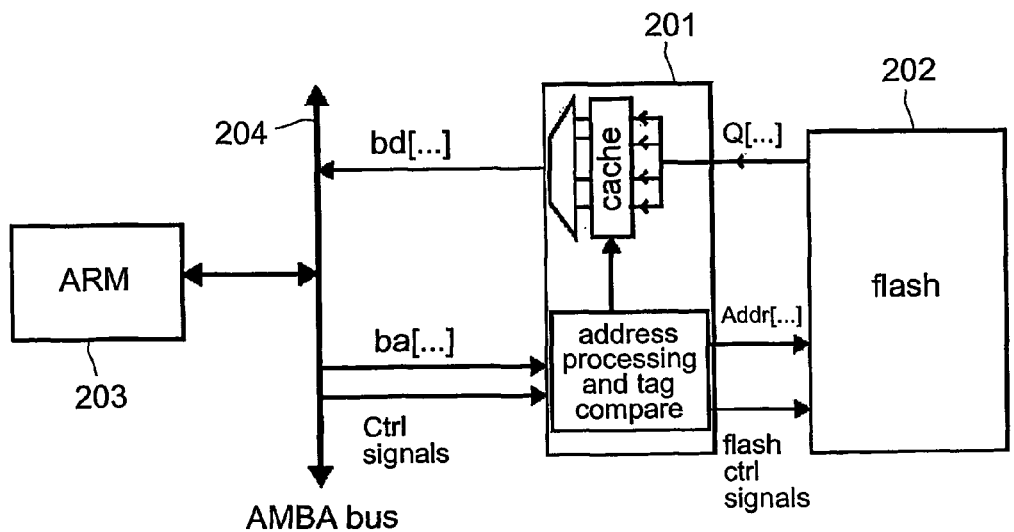
FIG. 2 shows a line cache memory between the system bus and the flash memory with a flash memory word width larger then the bus width.

As said the embedded flash memory access time must keep pace with the microprocessor clocking rates to achieve the required processor performance. A solution in order to solve this problem is a further volatile memory layer in the memory hierarchy between the flash memory 202 and the processor 203 as shown in FIG. 2. A so called line cache memory 201 with a controller interfaces the flash memory 202 to the high speed microcontroller bus system 204. Although this subsystem is well suited for managing a complex system with multiprocessors, several volatile cache memories other than the flash memory and several clock domains, it is inefficient in a typical single processor system with only the flash memory as IMEM with high emphasis on the read performance of the memory.

FIG. 2 shows a typical advanced RISC machine (ARM) based bus subsystem (AMBA bus). In the typical application the flash memory 202 is too slow to be used as IMEM if the system clock period is shorter then the achievable flash memory cycle time. The possible solution in this case is to integrate an interface 201 with the flash memory 202 which serves for increasing the data word width of the flash memory 202 and for providing an address tag register which allows using the intermediate data storage registers as a cache memory. Such a system, due to the necessity of arbitration among several masters or ARM 203 and clock domains creates a further bottleneck other then the flash memory 202 for the data throughput.

Of course such a solution should not appear as a complete new level in the memory hierarchy, because in this case there should be no advantage in using the non-volatile memory as IMEM. That is why the size of the cache memory has to be as small as possible in order to get the best benefit both in terms of bandwidth and in terms of throughput. Because the performance of the system is strictly related to the ability of fetching instructions from the IMEM at the highest possible rate every miss in the volatile interface between the microprocessor and the flash memory represents a leak of performance. In a typical cache memory system the possibilities of a miss are mainly divided in misses for:

1. cold-start, this means no valid data at the begin of the operations are available, 2. jumps out of the cache memory space and 3. insufficient cache memory capacity also for very regular and sequential code.

For the first two possibilities architecture solutions can be found in the processor pipeline control unit. For the third case it is not just a matter of efficient sizing of the cache memory in relation to the application code. It is always due to the slow access speed and limited bandwidth of the flash memory, when it is the IMEM.

As said an approach in this kind of system is to integrate between the flash memory and the processor an interface with a n-line volatile register, from where the processor could fetch instructions with a high rate in hit case. During a miss of data in its registers the interface starts a reading operation on the flash memory, keeping the processor in wait state and fills the registers with the maximum amount of data readable from the flash memory at once. In this way, in case of very regular code, the next instructions fetched by the microprocessor should be located serially in the flash memory and then also be already present in the line cache memory after the first miss. Once the processor has read all the words present in the cache there will be a deterministic miss case due to the limited number of words in the line cache memory. Unfortunately enlarging the cache memory size does not help because of the fixed number of words readable from the flash memory at one time. So again the main limitation in such a system is the bandwidth of the flash memory. Also if the n-line cache memory is integrated in the interface the n-line cache memory could not be filled with a number of data bigger then the maximum of data achievable in a single flash memory read access.

In the following, the architecture according to the invention is described.

Figure 3:
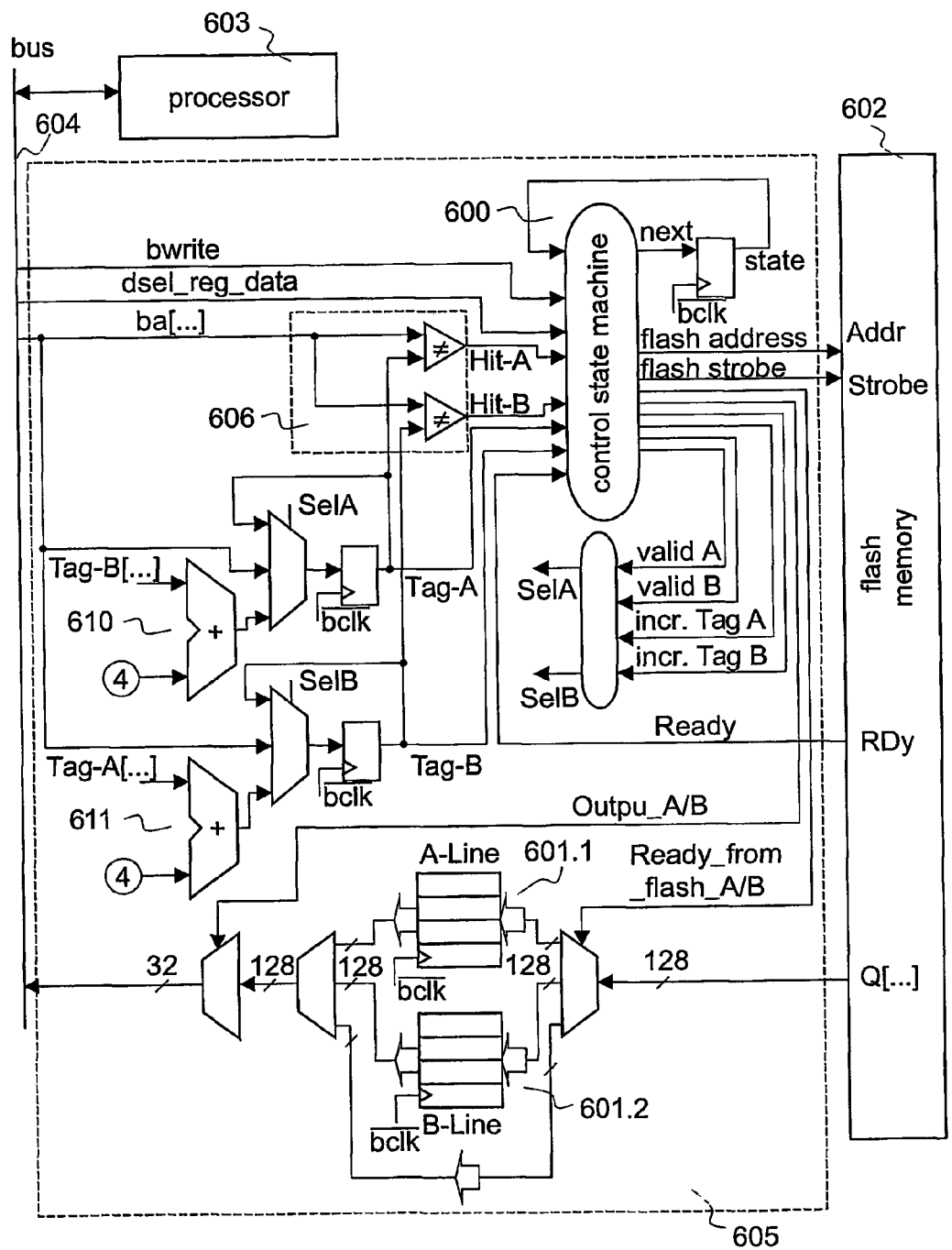
FIG. 3 shows a block diagram of the architecture according to the invention.

FIG. 3 shows a block diagram of the architecture according to the invention.

After the first miss cycle access to the flash memory 602 a certain number of words or instructions are available in the cache memory 601.1 and 601.2, for example x words. At this point, it is necessary to deliver this words as soon as they are available to the microprocessor 603, which will get out from wait state and will continue querying a new instruction at every clock cycle. A first level of automation in the interface is to restart querying the flash memory 602 immediately after the first x-words are available, incrementing autonomously the address.

The problem is that being not known a priori the system clock frequency it is not possible to predict the time required by the processor 603 for fetching all the x instructions from the line cache memory 601.1 and 601.2. That means it is not predictable if it is larger or smaller then another asynchronous access time of the flash memory 602. If in fact the frequency is such that the cache memory 601.1 and 601.2 is completely read, word after word, before the second, autonomous access to the flash memory 602 is finished, a conflict will arise, because there is a processors miss request plus an on-going read operation on the flash memory 602. Moreover the same phenomenon will happen if the code in the first x words contains a jump, which invalidates the content of the cache memory 601.1 and 601.2 and again arises a miss request while there is the autonomous reading going on. So although the so called predictive approach is a winning idea for anticipating the flash memory 602 read operation, it is not straightforward for the interface starting autonomously querying the flash memory 602 for the next x words. Attention must be paid in the control in order to get an improvement for the system and not to increase the conflicts and the read latency. The first consideration is that the read operation should be suitable for aborting. In this case it can in fact dynamically be decided to autonomously start a predictive new read in the flash memory 602 and eventually abort it and restart on another address.

Figure 4A:
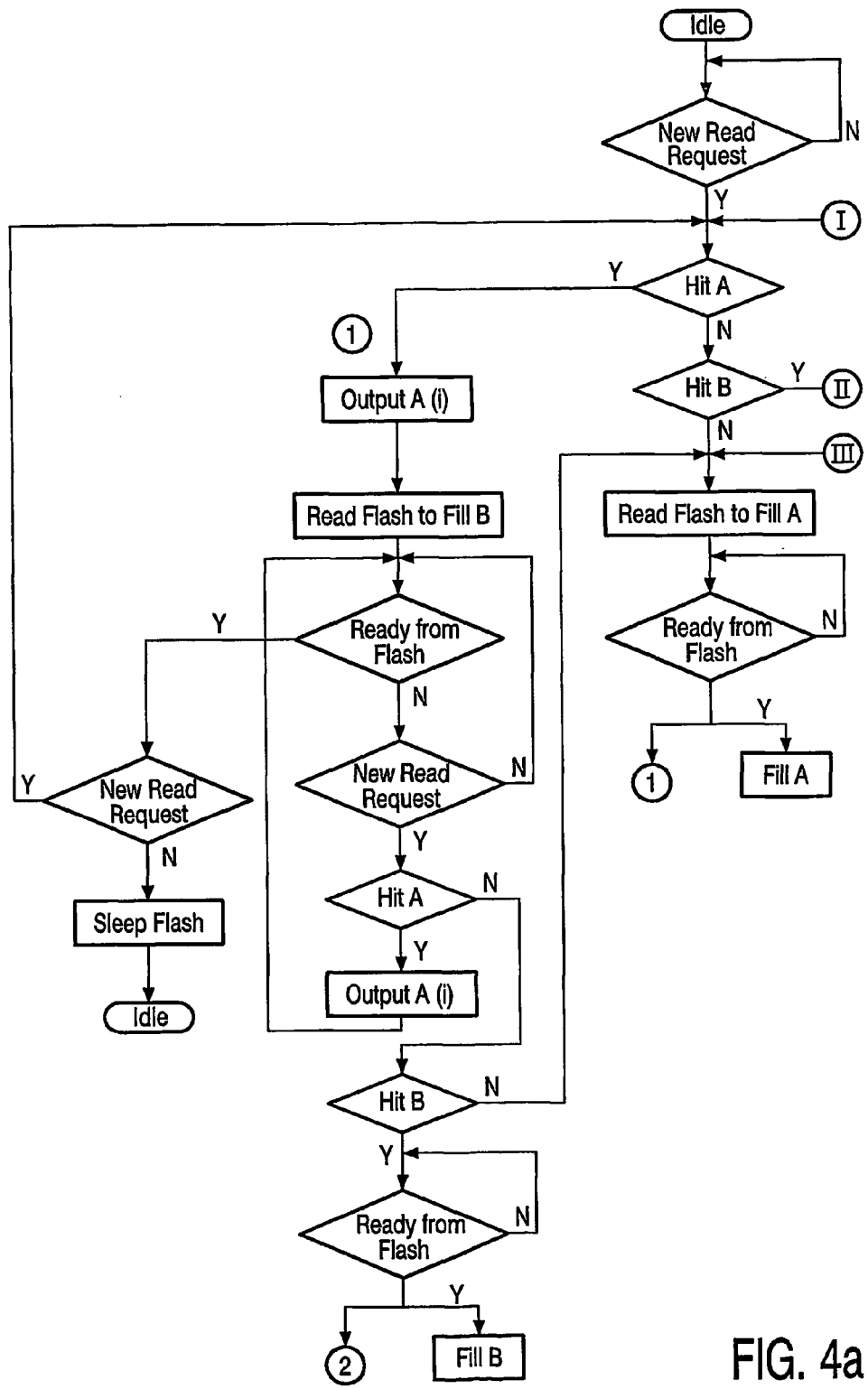
FIG. 4a shows a first part of a flow diagram representation of the operations performed by the architecture according to the invention in reading the memory.
Figure 4B:
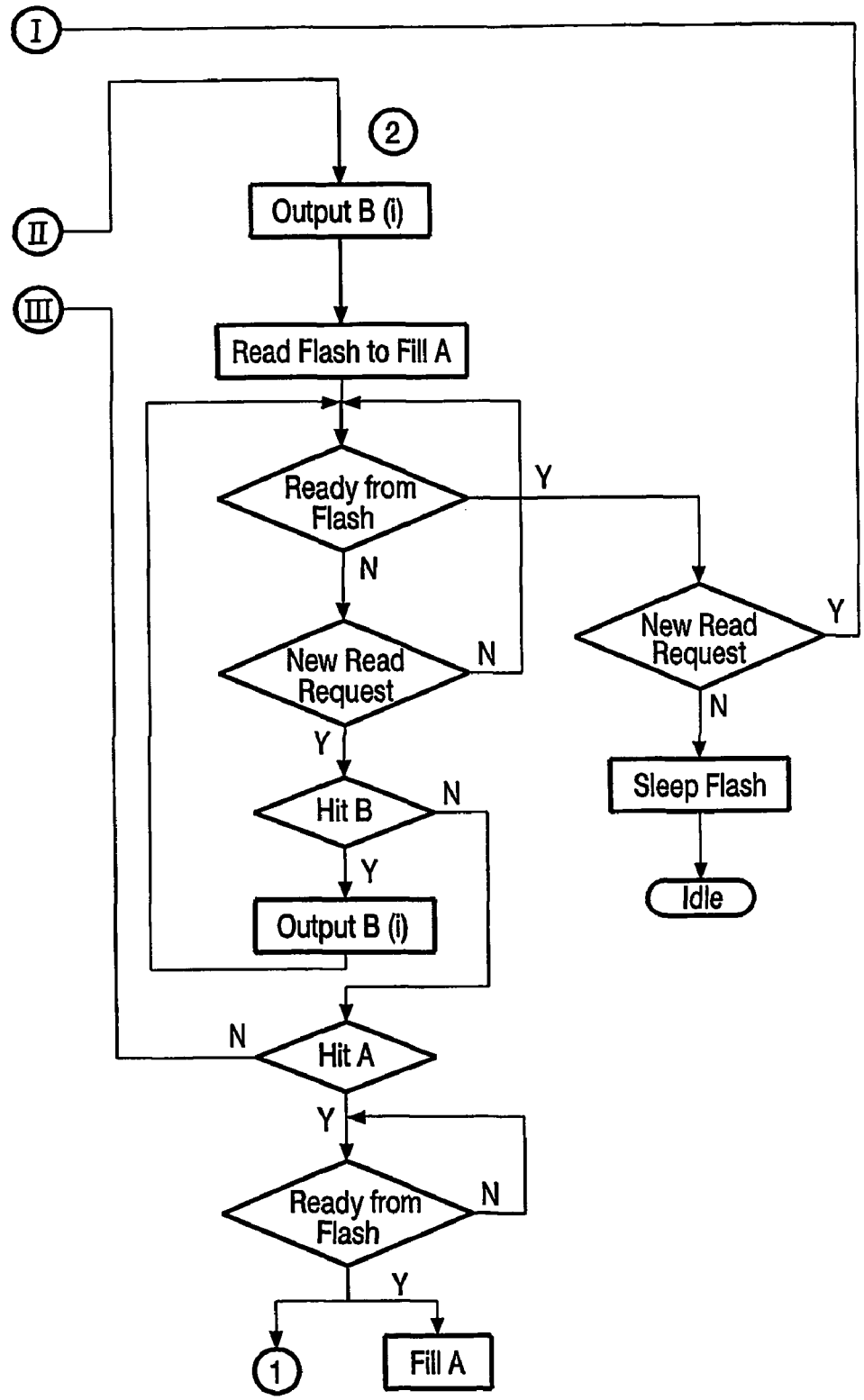
FIG. 4b shows a second part of the flow diagram representation of the operations performed by the architecture according to the invention in reading the memory.

In FIGS. 4a and 4b, a flow diagram of the operations performed by the architecture shown in FIG. 3 is presented. In this implementation is assumed to use a 2-line cache memory, in the following called A-Line cache memory 601.1 and B-Line cache memory 601.2 both of the same size as the flash memory bandwidth (x-words).

In the following the algorithm according to the invention is described.

The sequence of operation performed by the architecture shown in FIG. 3 is described in the flow diagram shown in FIG. 4a and FIG. 4b. The two parts of the diagram are connected together over the connecting points I, II and III.

1. Assuming a request from the microprocessor 603 as in a normal cache memory starts the interface 605 will compare the address with the two tags Tag A and Tag B with a comparator 606. Whenever a hit occurs on one of the two lines, A-Line cache memory 601.1 or B-Line cache memory 601.2, the other line cache memory will be filled through the predictive reading. In case of a miss in both line cache memories 601.1 and 601.2, this means that Hit A=0 and Hit B=0, a read operation in the flash memory 602 for filling the A-line cache memory 601.1 starts.

2. After reading the x words from the flash memory 602, the interface 605 fills and validates the A-line cache memory 601.1 and delivers the word required by the processor 603. This is a so called write through approach.

3. At the same time the interface 605 starts a new predictive reading on the next, this means the x+1 address of the flash memory for filling the B-line cache memory 601.2.

4. During the predictive reading, the interface 605 still monitors the requests from the microprocessor 603. Three cases are possible before the end of the predictive reading.

a) The processor 603 is performing an internal operation and stops fetching other instructions. In this case at the end of the predictive reading the B-line cache memory 601.2 is filled and the second tag Tag B becomes validate.

b) The processor 603 requests other words from the A-line cache memory 601.1, this means HitA=1. The predictive reading goes ahead until the end, fills the B-line cache memory 601.2 and validates the second tag Tag B.

c) The processor 603 requests a word which is not present in the A-line cache memory 601.1, this means Hit A=0. This case could happen either for a jump or because the processor 603 has fetched already all the instructions in the A-line cache memory 601.1. The interface 605 now will compare the address requested with the second tag Tag B while the address of the predictive reading still running. Now two cases can appear.

c.1) The addresses are not equal. In this case the prediction was not right. Both line cache memories A-Line 601.1 and B-Line 601.2 are not valid and the running read operation has to be aborted to start a new one with the right address. As for a cold-start the new read words will fill the A-line cache memory 601.1 and then a new predictive read to fill the B-line cache memory 601.2 will start.

c.2) The addresses are equal. So also if it is not a real hit because the B-line 601.2 is not yet ready the prediction was right. In this case the big advantage is that the reading on this address was already started and this will reduce the number of wait states for the microprocessor 603 and then the latency. So the predictive read operation becomes effective and at its end a new predictive one will start to fill the A-line cache memory 601.1.

The addresses are increased by a first predictor 610 and a second predictor 611. The first predictor 610 uses the Tag B and increments it by a certain first value for example by four. The second predictor 611 uses the Tag A and increments it by a second value, which is normally the same as the first value.

Figure 5:
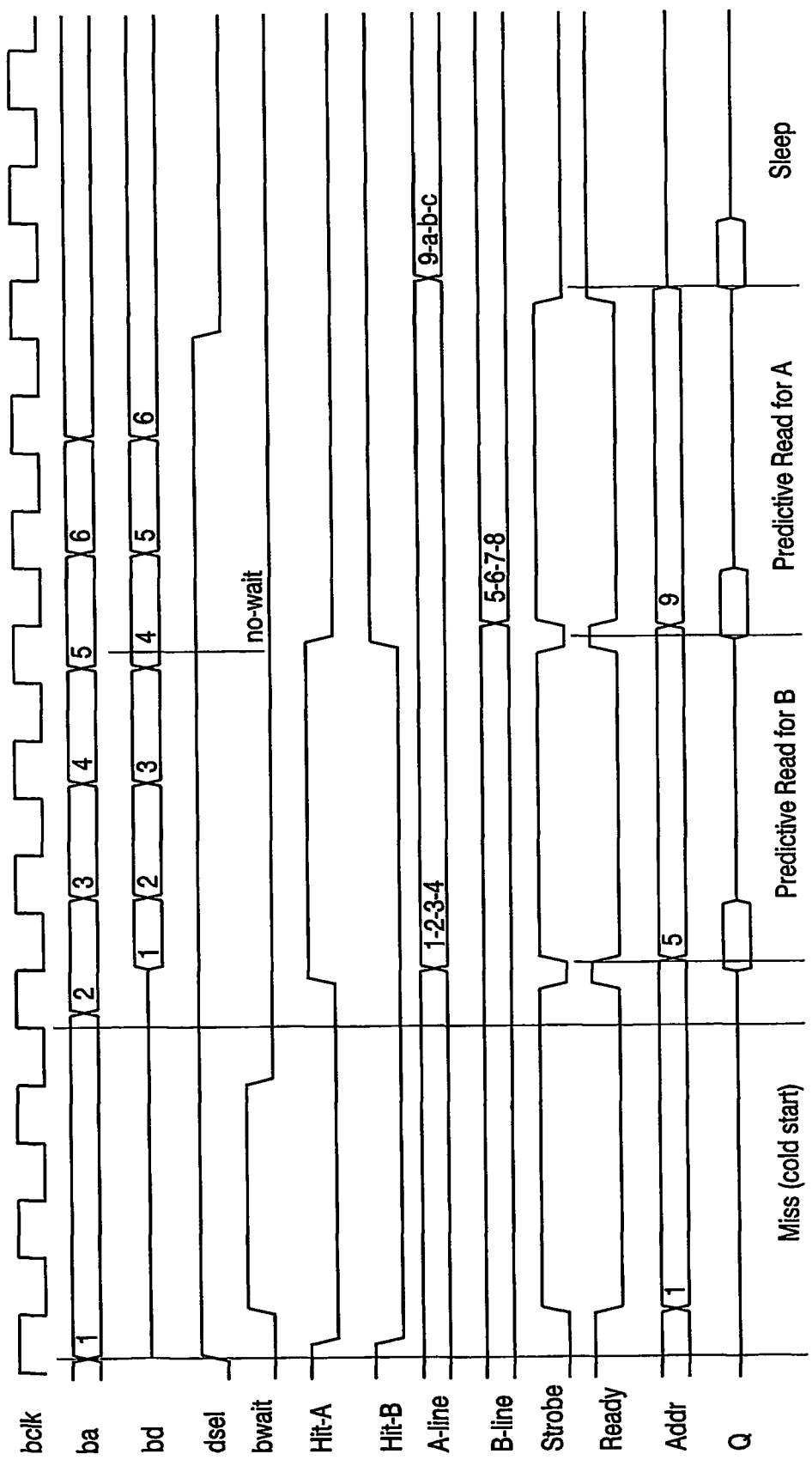
FIG. 5 shows a timing diagram of the main signals involved in a read operation for fetching six instructions without jumps with the architecture according to the invention.
Figure 6:
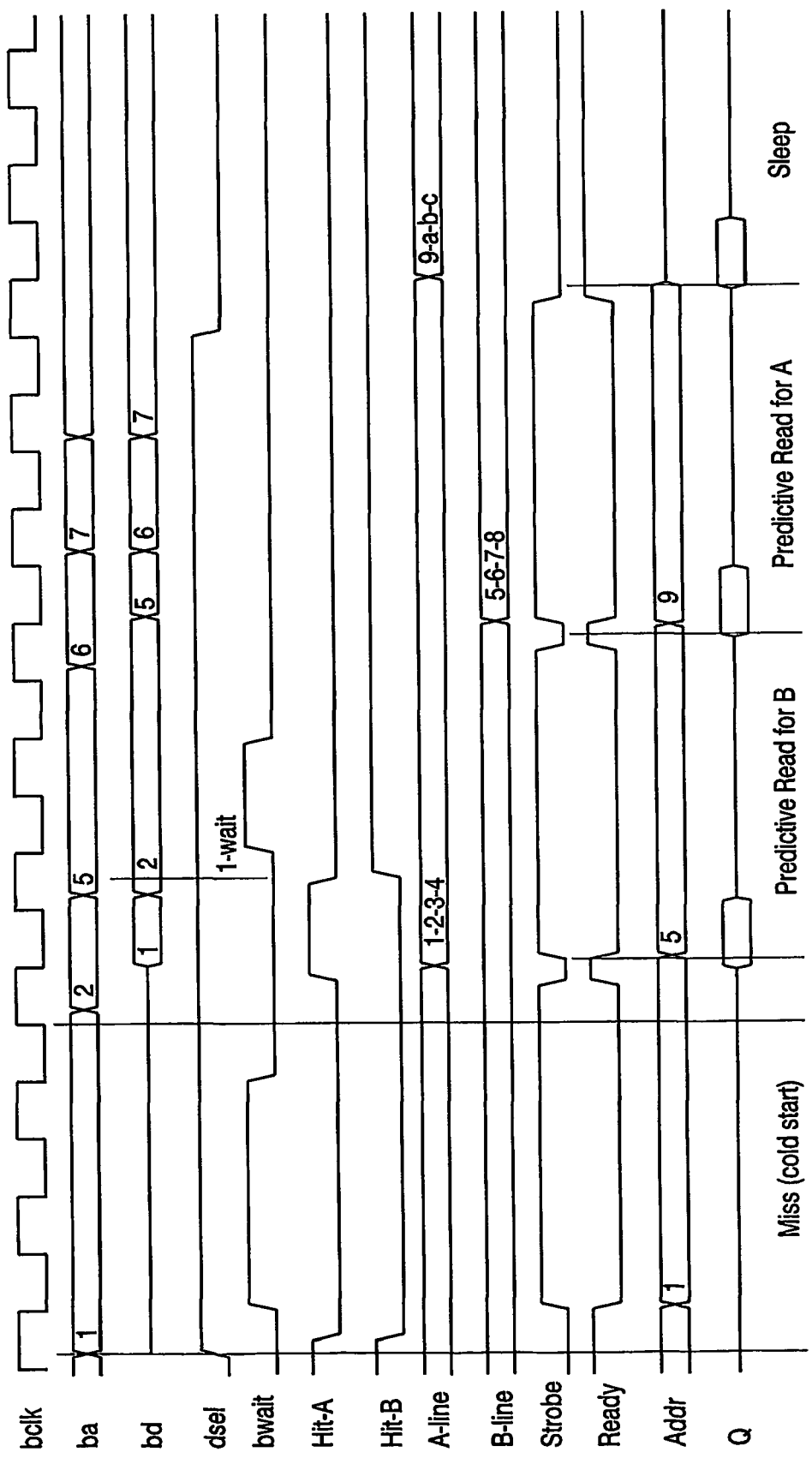
FIG. 6 shows a timing diagram of the main signals involved in a read operation for fetching five instructions with one jump to a close word with the architecture according to the invention.
Figure 7:
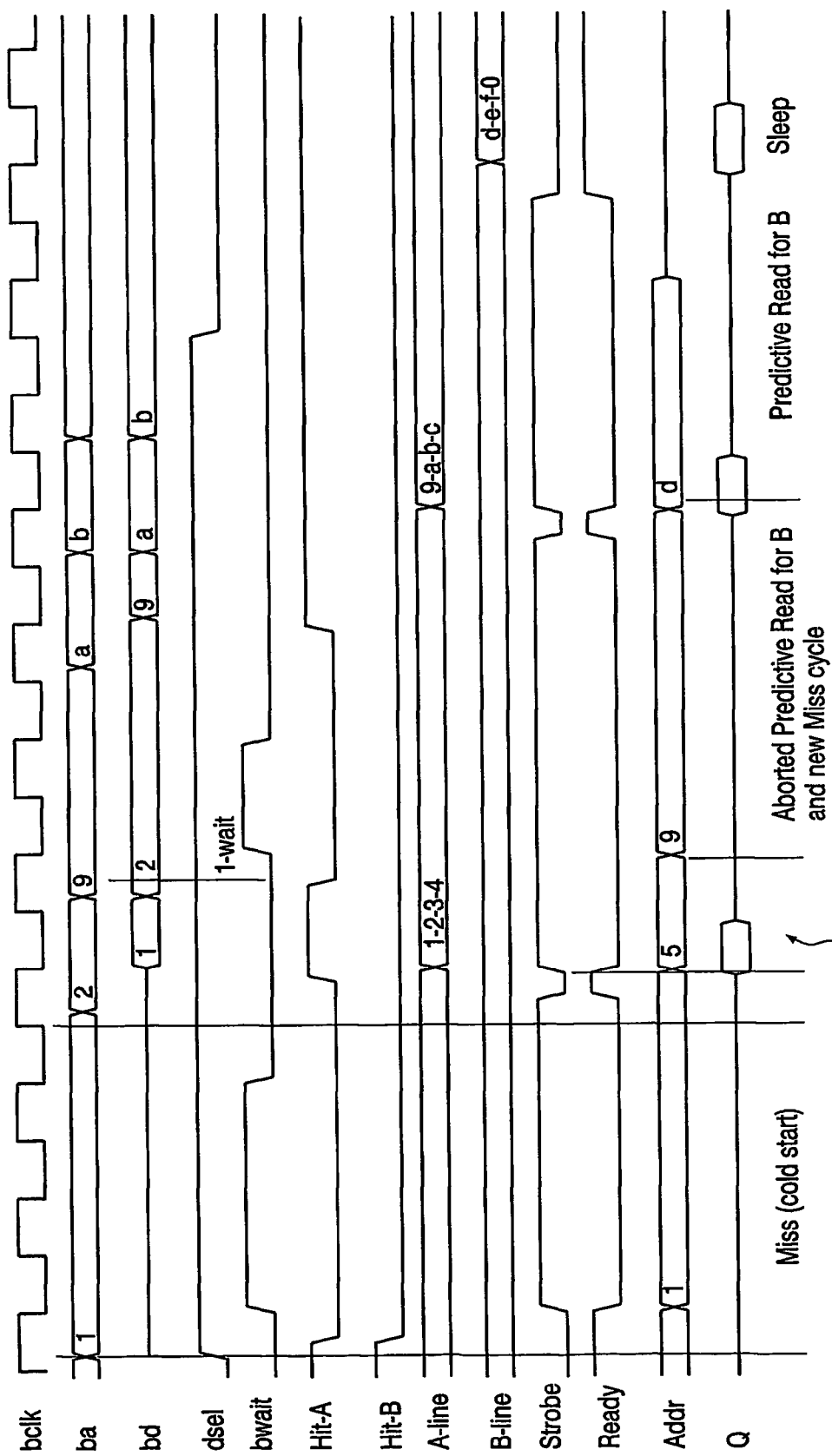
FIG. 7 shows a timing diagram of the main signals involved in a read operation for fetching five instructions with one jump to a miss instruction with the architecture according to the invention.

In FIGS. 5, 6, and 7 a timing representation of the main operations is given. In this examples the flash memory access time is assumed to be around 3 times the processor clock speed and the word width of the flash memory in read mode is assumed of 4 words as well as the two line caches A-Line 601.1 and B-Line 601.2.

In the example shown in FIG. 5 after a miss cycle the predictive reading for the cache memory B-Line 601.2 allows no-wait reading after the first 4 words.

In the example shown in FIG. 6 after a miss cycle and a further hit cycle a jump occurs in the code, but the jumped address is equal to the predicted one and then the miss read operation is already started. This allows to reduce the number of wait states from 2 to 1. This also will be the case when the clock speed more fast and the A-line cache memory 601.1 will be completely read in less then the predictive access on the flash memory for the B-line cache memory 601.2.

In the example shown in FIG. 7 after a miss cycle and a further hit cycle a jump occurs in the code, in this case the jumped address is different from the predicted one and then the predictive reading for the B-line cache memory 601.2 has to be aborted and a new miss read has to start. In this case although there is no gain through the predictive read operation no further latency has been added by the controller.

From the description of the architecture several advantages of the invention are evident. The interface 605 is able either to reduce the miss rate in the line cache memory 601.1 and 601.2 or to reduce the number of wait states for predicted misses, in a completely transparent way without introducing further wait states for the control logic. These results are achieved by an efficient hardware algorithm for controlling register bank used as a fully associative cache.

The innovation consist in a hardware algorithm meant to reduce drastically the miss rate due to the small cache capacity, and so suitable for improving the system performances in all those application with regular serial code. The invention with its architectural implementation is well suited for all the applications in which a single microprocessor as master, uses a slow access embedded flash memory as instruction memory with different word widths. For all this cases the computing performances of the system cycles per instruction (CPI) and million instructions per second (MIPS) become strictly dependent to the memory throughput. So the more the interface is fast in querying the flash memory the higher are the performances.

The invention is not limited to an interface with a two line cache memory. It depends on the technical aims, which number of lines for the cache memory should be chosen. Sometimes for example a three or four line cache memory might be helpful.

The invention claimed is:

1. An integrated circuit with a processor, a non-volatile memory and an interface connecting said processor to said non-volatile memory, wherein said interface contains a first cache memory and a second cache memory, said first and/or said second cache memory being equipped for storing data corresponding to determined addresses of the non-volatile memory, and said interface providing said processor selectively with data from said first cache memory or from said second cache memory and fetching data from said non-volatile memory corresponding to a next determined address.

2. The integrated circuit according to claim 1, wherein the interface contains an address predictor which delivers the next determined address which is a succeeding address of the non-volatile memory with respect to an immediately previously determined address.

3. The integrated circuit according to claim 1 or 2, wherein the non volatile memory is a flash memory.

4. The integrated circuit according to claim 3, wherein the interface contains an address comparator which gets an address from the processor and compares it with two addresses corresponding to the data stored in the first and the second cache memory.

5. The integrated circuit according to claim 4, wherein the address comparator is a permanent address comparator, which delivers a first output signal (Hit A) when the address from the processor equal to the address corresponding to the data stored in the first cache memory, and which delivers a second output signal (Hit B) when the address from the processor is equal to the address corresponding to the data stored in the second cache memory.

6. The integrated circuit according to claim 4, wherein the two addresses corresponding to the data stored in the first and second cache memory are a first and a second tag (Tag A, Tag B).

7. The integrated circuit according to, claim 1, wherein the interface delivers the data to the processor directly from the non-volatile memory, when said data are not buffered in the first or the second cache memory.

8. The integrated circuit according to, claim 1, wherein the data word width of each of the first and the second cache memory the same data word width as the non-volatile memory.

9. The integrated circuit according to, claim 1, wherein the non-volatile memory is used as instruction memory.

10. A method for fetching data from a non-volatile memory embedded in an integrated circuit, comprising the following steps
a) a part of the data from said non-volatile memory is buffered in two cache memories under a first and a second tag address (Tag A, Tag B, respectively,
b) if data are requested from said non-volatile memory by a requesting means, the address corresponding to said data will be compared with said two tag addresses (Tag A, Tag B),
c) if said data address is equal to one of said two tag addresses (Tag A, Tag B), the data in a one of said two cache memories that corresponds to said one tag address are delivered to said requesting means and the data in the order of said two cache memories are updated, otherwise both cache memories are updated at the same time and the requested data are delivered to said requesting means.

11. The method according to claim 10, wherein the step of updating data includes a predictive reading of the non-volatile memory.

12. The method according to claim 11, wherein said cache memory is updated with the data corresponding to a succeeding address of the non-volatile memory with respect to an immediately previously determined address which was used to update data in the cache memory.

13. The integrated circuit according to claim 5, wherein the two addresses corresponding to the data stored in the first and second cache memory are a first and a second tag (Tag A, Tag B).

14. The integrated circuit according to claim 2, wherein the interface delivers the data to the processor directly from the non-volatile memory, when said data are not buffered in the first or the second cache memory.

15. The integrated circuit according to claim 3, wherein the interface delivers the data to the processor directly from the non-volatile memory, when said data are not buffered in the first or the second cache memory.

* * * * *